Sept. 5, 1967  C. K. KROELL ET AL  3,339,674
ENERGY ABSORBING DEVICE
Filed March 12, 1965

INVENTORS
Charles K. Kroell &
BY  Ralph E. Siegrist

S.C. Thorpe
ATTORNEY

3,339,674
ENERGY ABSORBING DEVICE
Charles K. Kroell, Royal Oak, Mich., and Ralph E. Siegrist, Montclair, Calif., assignors to General Motors Corporation, Detroit, Mich., a corporation of Delaware
Filed Mar. 12, 1965, Ser. No. 439,326
3 Claims. (Cl. 188—1)

This invention relates to devices for absorbing energy of impact forces effecting relative movement between two members having a normally fixed spatial relation to each other. Such devices are needed, for example, as supports for anchoring vehicle seats, as "scram" stoppers for nuclear reactor control rods, as crash-yielding sections of vehicle steering columns, as buffer elements acting in parallel with couplers between rail vehicles, etc.

The invention has as its primary objective to provide an improved device of this type for absorbing energy through telescoping a tubular member axially of itself, whereby the side walls of the tube are progressively flexed or bent radially and then reversed axially in a direction along the length of the tube. Such initial bending and restraightening of the tube side walls effects a double working of the material with consequent efficient energy absorption in terms of the length of displacement of the tube ends relative to each other. The absorption devices in accordance with the invention have important advantages over others of this type in being less expensive to manufacture, easier to apply between the structures to be used therewith, and less subject to malfunctioning caused by defects or non-uniformity of the tubular material.

These and other objects and advantages of the invention will be readily understood from the following description of one preferred embodiment thereof, having reference to the drawing, wherein.

Figure 1:
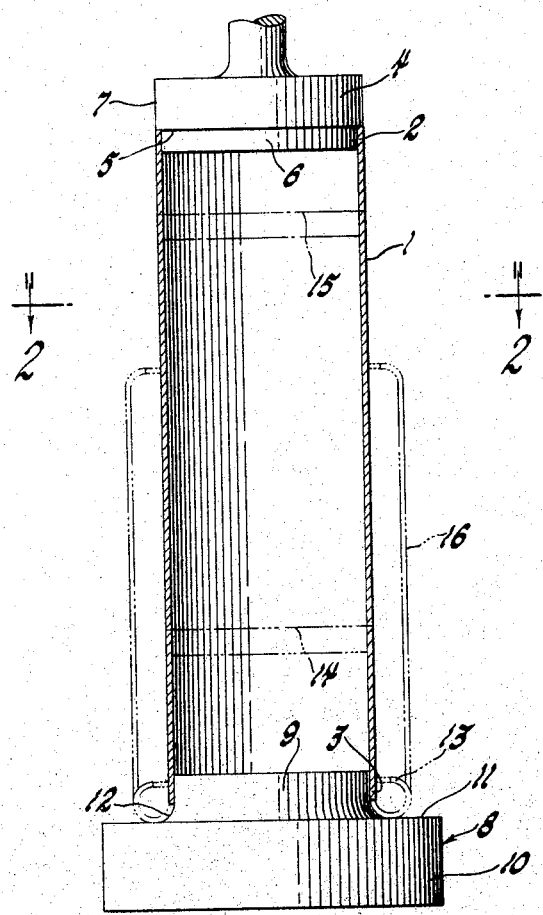
FIGURE 1 is a longitudinal sectional view of the improved energy absorber.
Figure 2:
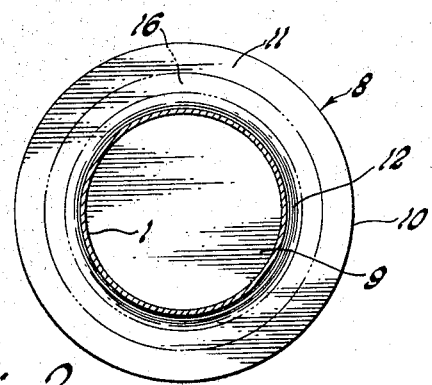
FIGURE 2 is a transverse sectional view taken substantially along the line 2—2 of FIGURE 1.

As shown, the absorber comprises a tube 1 of relatively stiff but ductile material, such as mild steel, copper or aluminum, however, other materials than metal may be used having a sufficient modulus of elasticity to provide the desired rate of energy absorption. The thickness of the tube walls to be used similarly depends upon the force to be expected in service, the thickness being also a factor to be selected in relation to the diameter of the tube. One such specification of the tube 1 which has proven satisfactory is 3003 aluminum of 3" outside diameter and $\frac{1}{16}$" wall thickness. Other suitable materials, of different diameters and wall thicknesses, may be used to suit the particular application desired for the device.

The tube 1 is of circular cross section and, as initially formed, is open at both ends 2 and 3. Opposite its end 2 is a load applying member 4 having an end face 5 adapted to abut the tube end 2. Inwardly adjacent this face 5 may be provided a reduced diameter portion 6 which extends a slight distance inwardly of the tube to provide support therefor during collapsing movement of the tube as later to be described. Preferably, the lateral extremities 7 of the member 4 do not extend substantially beyond the diametrical outer periphery of the tube 1, particularly where it is desired that the tube have a maximum useable length for absorbing energy. Disposed opposite the other end 3 of the tube is a reaction member 8 having an annular portion 9 whose cylindrical outer periphery is slightly smaller in diameter than the internal diameter of the tube so that it is adapted to be pilotably received within that end of the tube. This annular portion 9 projects from the main or base portion 10 of the reaction member and includes an annular flange 11 extending outwardly beyond the outer periphery of the tube. Interconnecting this flange and the sides of the annular portion 9 is a fillet or die surface 12. This is preferably arcuate or generally arcuate in radial section and tangentially mergers or joins with the sides of the annular portion and with the flange 11.

The device may be assembled with a tube 1 of uniform cross section as shown in solid lines in the drawing, or with a tube whose end 3 has been initially preformed by swaging or upsetting so that it is curled outward and partially inward of itself to the shape shown at 13. In the latter case, relative movement of the members 4 and 8 toward each other results in the fillet or die surface 12 producing a progressive outward flaring and reverse bending of the tube side walls. Thus, upon the load applying member 4 reaching the dotted line position 14, the reverse bending of the tube side walls will have progressed to the extent shown in the phantom outline 16.

Preferably, however, such preliminary preforming of the tube end 3 is dispensed with, and the initial outward flaring and inward curling to the stage shown at 13 is accomplished in use while the load applying member moves to the dotted line position 15. The radius of the die surface must, of course, be held within reasonable limits depending upon the material and dimensions of the tube to be used (e.g. approximately $\frac{1}{4}$" radius in the case of the aforementioned example) to avoid exceeding the ultimate tensile strength of the tube material. Also, this surface should obviously be relatively smooth and free of obstruction where it merges with the annular portion 9 and the flange 11, so that good results are achieved without such preliminary preforming of the tube end 3. Further, by confining the lateral outward extremities 7 of the load applying member 4 so as not to exceed the diametrical outer periphery of the tube, the collapsing operation can be carried out until the portion 6 of the load applying member moves into abutment with the annular portion 9 of the reaction member, thereby utilizing the full length of the tube for energy absorption.

Of course the length of the tube to be used must be held within reasonable limits to prevent columnating. Specific maximum length is dependent upon both the tube diameter and its wall thickness. As one practical example, the tube such as described made of soft aluminum or copper and having a diameter of approximately 3" and wall thickness of approximately $\frac{1}{16}$" has been found to perform satisfactorily for the purpose without columnating, even at lengths up to 15". It is not intended, however, to limit the invention to these specifications, materials or dimensions, which are mentioned only by way of example. Likewise, it is appreciated that a varying rate of energy absorption may be obtained by, for example, using a tube of tapered thickness, slots or other side openings in the tube walls etc., and that various other changes in the arrangement of the parts and their connecting means may be made, all within the spirit and scope of the invention as hereinafter claimed.

We claim:
1. An energy absorber consisting of a tube of relatively stiff but ductile material and of circular cross-section, means for axially loading one end of the tube in thrust, the opposite end of said tube being open, and a rigid member having an annular die surface coaxial with and facing said open end of the tube, said die surface initially flaring the open end of the tube by circumferentially elongating adjacent peripheral sections of the tube without exceeding the ultimate tensile strength of the tube material to maintain the peripheral continuity of the tube, and thereafter, without exceeding the ultimate tensile strength of the tube material to continue maintenance of the peripheral continuity of the tube, progressively reversely bending the adjacent peripheral sections of the tube as the axial loading means move relative to the die surface to form the open end of the tube into a coaxial extension of the tube.

2. An energy absorber as recited in claim 1 wherein the annular die surface has a portion thereof piloted axially within the open end of the tube and another adjacent portion thereof facing radially and axially toward the open end of the tube and engaged thereby to flare the open end of the tube.

3. An energy absorber as recited in claim 2 wherein the adjacent portion is of generally annular arcuate cross section and tangentially merges into the first portion.

References Cited

UNITED STATES PATENTS

| 3,143,321 | 8/1964 | McGeehee et al. | 188—1 X |
| 3,236,333 | 2/1966 | Mitchell | 188—1 |

FOREIGN PATENTS 472,071   3/1951   Canada.

DUANE A. REGER, *Primary Examiner.*